Figure 1:
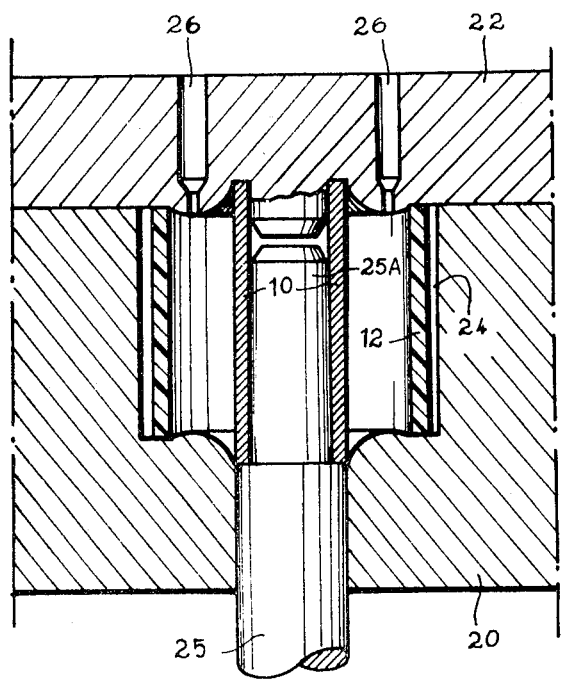

United States Patent

[11] 3,608,049

| [72] | Inventor | Corrado Tavella<br>Milan, Italy |
|------|----------|--------------------------------|
| [21] | Appl. No. | 747,325 |
| [22] | Filed | July 24, 1968 |
| [45] | Patented | Sept. 21, 1971 |
| [73] | Assignee | Societa Applicazioni Gomma Antivibranti<br>"Saga" S.p.A.<br>Milan, Italy |
| [32] | Priority | Sept. 29, 1967 |
| [33] | | Italy |
| [31] | | 21,055-A/67 |

[54] PROCESS FOR MANUFACTURING A RESILIENT MOUNTING ELEMENT
2 Claims, 3 Drawing Figs.

[52] U.S. Cl................................................ 264/229,
29/235, 29/451, 264/230, 264/262, 264/266,
287/85 R
[51] Int. Cl...................................................... B23p 11/02,
B23p 19/02, B29c 25/00, B29h 9/11, F16f 1/38
[50] Field of Search............................................ 264/262,
328, 230, 266, 229

[56] References Cited
UNITED STATES PATENTS

| 2,684,502 | 7/1954 | Paulve.......................... | 264/328 |
| 2,689,755 | 9/1954 | Krotz............................ | 264/262 |

*Primary Examiner*—Robert F. White
*Assistant Examiner*—J. H. Silbaugh
*Attorney*—Sughrue, Rothwell, Mion, Zinn & Macpeak ABSTRACT: A method for manufacturing a resilient mounting element having a vulcanized rubber sleeve interposed between two cylindrical bushings. Inner and outer cylindrical bushings are coaxially positioned within a cylindrical mold cavity. The outer bushing is made of a resilient plastic having a relatively high tensile strength and modulus of elasticity and has a diameter somewhat smaller than the diameter of the mold cavity. Rubber is injected under pressure between the bushings to cause a controlled resilient increase in the diameter of the outer bushing to force the outer bushing against the mold cavity wall. The injection pressure is maintained while the rubber is vulcanized and the pressure is then released. The outer bushing then resiliently returns toward its original diameter, thereby compensating in part for the shrinking strains in the rubber.

PROCESS FOR MANUFACTURING A RESILIENT MOUNTING ELEMENT

This invention relates to a process for manufacturing resilient mounting elements for use in antivibrational mechanical connections, and more particularly such mounting elements of the type comprising a vulcanized rubber sleeve interposed between two relatively stiff bushings.

In previously known mounting elements of this type the bushings are made of metal. It is known to reduce the diameter of the outer bushing by drawing in order at least to allow for the shrinking of the rubber on vulcanization, and also to effect radial compressive prestressing of the rubber sleeve to increase the resistance of the mounting element to fatigue. The outer bushing after drawing should have well-defined dimensions with sufficiently narrow tolerances to give a required interference fit with respect to a seating into which said bushing is force-fitted.

An object of the present invention is to provide an improved process for manufacturing a resilient mounting element of the above-defined type, in which compensation of the shrinkage of the rubber sleeve, and prestressing of the sleeve, can be effected simply.

The resilient mounting element according to the invention is characterized in that at least one of the bushings is formed of plastics having high tensile strength and modulus of elasticity and is maintained in close surface contact with the sleeve by virtue of resilient return forces in said plastics bushing or bushings, which return forces compensate at least in part for shrinking strains in the rubber sleeve resulting from vulcanization.

The resilient return forces in said bushing or bushings result from a resilient change in the original diameter of the or each plastics bushing caused by the injection pressure of the rubber during formation of the sleeve, which pressure is maintained during vulcanization of the sleeve. The resilient return of the plastics bushing or bushings towards the initial diameter gives rise to said return forces. Preferably the resilient return forces in said plastics bushing or bushings are such as to prestress the rubber sleeve compressively.

Figure 2:
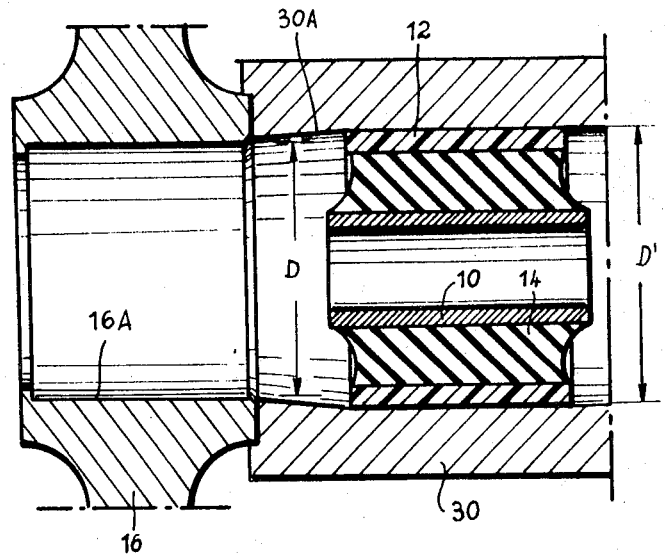
Figure 3:
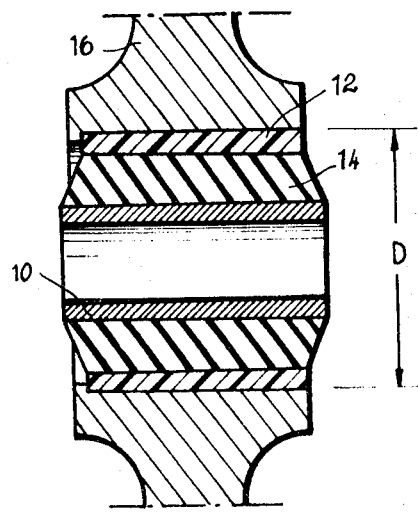

The invention will be more clearly understood from the following description, given by way of example only, with reference to the accompanying drawings, in which: FIG. 1 is an axial sectional view of a mould at an initial step in the manufacture of a mounting element according to one embodiment of the invention; FIG. 2 is an axial sectional view showing the completed mounting element, illustrating its fitting into a seating socket, and FIG. 3 is an axial sectional view of the mounting element in position in said socket.

In the embodiment illustrated in the drawings a resilient mounting element for effecting antivibrational mechanical connections and mountings comprises a stiff inner cylindrical bushing 10 of steel, an outer coaxial cylindrical bushing 12 of plastics and a vulcanized rubber sleeve 14 interposed between the bushings 10, 12.

The mounting element is intended in this embodiment to effect a resilient mechanical connection between a spigot (not shown) which is received within the inner sleeve 10 and a socket 16A (FIG. 2) formed in a seating member 16, within which the outer bushing 12 is force-fitted.

The plastics of the outer bushing 12 should have a tensile strength of at least 600 kg./sq.cm., a modulus of elasticity of 8,000 to 20,000 kg./sq.cm., and a softening temperature of at least 170° C. Examples of suitable plastics are nylon (registered trade mark) obtained by the condensation of hexamethylenediamine with adipic acid (polyhexamethylene adipamide) and known under the name "nylon 66," which has a tensile strength of 800 to 1,000 kg./sq.cm. a modulus of elasticity of 14,000 to 20,000 kg./sq.cm. and a melting point of about 260° C., and a nylon obtained by the polycondensation of caprolactam and known under the name of "nylon 6," having a tensile strength of 680–900 kg./sq.cm., a modulus of elasticity of 13,000 to 18,000 kg./sq.cm., and a melting point of 215 to 220° C. In addition to polyamides, polyoxymethylenes and similar acetal synthetic resins such as an acetal resin of the composition ($OCH_2$-) derived by the polymerization of formaldehyde and known as DELRIN (Registered Trade Mark) and distributed by E. I. du Pont de Nemours Inc. are suitable.

In general, thermoplastic linear polymers, which exhibit a wide range of elastic deformation with minimum permanent deformation, are suitable for the plastics bushing 12.

The mounting element is manufactured by arranging the inner and outer bushings 10, 12 in a divided mould (FIG. 1) comprising a hollow body portion 20 and a cover plate 22. The body portion 20 has a cylindrical mould cavity 24 the diameter of which exceeds that of the undeformed plastics outer bushing 12 by a predetermined amount, dependent upon the radial shrinkage which occurs in the rubber sleeve 14 upon vulcanization. An ejector rod 25 is slidable axially in the body portion 20 and has a cylindrical extension 25A disposed coaxially within the mould cavity 24, the inner metal bushing 10 being a friction fit on the extension 25A.

Injection inlets 26 are provided in the mould cover plate 22 for injecting rubber mix under pressure into the mould between the two bushings 10, 12 therein. The injection pressure is such that the plastics outer bushing 12 expands resiliently until it contacts the cylindrical wall of the mould cavity 24: that is, the bushing 12 undergoes a controlled increase in diameter. The injection pressure is maintained during vulcanization of the rubber to form the sleeve 14 to keep the bushing 12 in contact with the mould cavity wall.

After vulcanization of the sleeve 14 the injection pressure is removed and the mould is opened by removal of the cover plate 22. The completed mounting element is then ejected from the mould cavity 24 by movement of the ejector rod 25 axially into the cavity 24.

Upon relief of the applied pressure the outer bushing 12 becomes free to return resiliently towards its initial diameter, causing a spontaneous reduction in the diameter of the bushing 12. This resilient return compensates for the shrinkage of the sleeve 14 occuring on vulcanization and substantially removes the internal traction strains acting radially in the rubber sleeve 14. Preferably, the reduction in diameter is sufficiently large to effect radial compressive prestressing of the sleeve 14 in addition to removal of the internal traction strains in the sleeve.

Typically, the difference between the external diameter of the expanded outer bushing 12, which equals the diameter of the mould cavity 24, and the initial external diameter of the bushing 12, is between 0.5 and 2 percent of the said initial diameter. At the lower end of this range, a 0.5 percent difference in these two diameters is sufficient to effect satisfactory compensation of the shrinkage strains in the rubber sleeve 14, while at the upper end of this range, a 2 percent difference causes, in addition, radial prestressing of the rubber sleeve 14. If desired, the said difference between the two diameters may even exceed 2 percent provided the elastic properties of the bushing 12 are such that the latter can withstand such a diameter change.

The radial expansion of the bushing 12 in the mould cavity 24 will be accompanied by stretching of the bushing 12 circumferentially, such stretching tending to reduce the resilient return forces with which the bushing 12 acts on the sleeve 14. The effect of such stretching, which in practice is generally negligible, may be compensated by augmenting the resilient return forces caused by the elasticity of the bushing 12 by thermally induced return forces caused by heat-shrinking of the bushing 12. For example, where the bushing 12 is of "-NYLON," such shrinkage may be caused by treating the mounting element after vulcanization in hot water at 85° C. to 100° C.

The resulting resilient mounting element has an outer diameter D', FIG. 2, which is somewhat larger than the diameter D of the socket 16A into which it is to be fitted, since the initial external diameter of the bushing 12 before formation of the element should not be smaller than D, and, furthermore, the resilient return of the bushing 12 after expansion thereof will never be complete. Typically, the initial external diameter of the bushing 12 is larger than D by 1 to 3 percent. As a result, the bushing 12 of the completed mounting element is an interference fit in the socket 16A. This is an advantageous feature, for it enables further reduction in the diameter of the outer bushing 12, and further resilient compression of the sleeve 14, to be effected upon fitting the lounging element into the socket 16A. In one example, the diameter D was 45 mm. and the thickness of the bushing 12 was 3 mm.

For fitting the mounting element into the socket 16A a tool 30 is used, as shown in FIG. 2. The tool 30 has a cylindrical through bore in which the completed mounting element is a close fit. At one end this bore has a frustoconical wall 30A which tapers smoothly to the diameter D of the socket 16A. In use, the tool 30 is placed with the smaller diameter end of its frustoconical wall 30A adjoining one end of the bore 16A coaxially therewith. The mounting element is then forced axially from the tool 30 into the socket 16A, whereupon it is deformed by the wall 30A, force-fitting the bushing 12 in the socket 16A. This causes the sleeve 14 to undergo further radial compression which augments the compression caused by the resilient return of the bushing 12 during manufacture of the mounting element. The element is thereby tightly fitted in the socket 16A and the risk of the sleeve 14 separating from the bushings 10, 12 is minimized.

The invention has been described specifically with reference to a mounting element having a plastics outer bushing 12. It will be appreciated, however, that similar considerations apply where the inner bushing 10 is of plastics material, or where both bushings 10 and 12 are of plastics material.

When the inner bushing 10 is of plastics, it will undergo a radial compression upon injection-moulding of the rubber sleeve 14, the cylindrical extension 25A in the mould cavity 24 being suitably dimensioned to accommodate such compression. However, in view of the small diameter of the inner bushing 10 as compared with the outer bushing 12, the variations in diameter which can be imparted to the inner bushing are relatively small.

I claim:

1. A process for manufacturing a resilient mounting element in a mold cavity, comprising providing a mold having a cylindrical cavity of a given diameter, providing in said cylindrical cavity an inner cylindrical bushing and coaxial therewith an outer cylindrical bushing of a diameter smaller than the diameter of the cylindrical cavity, the difference between the outer diameter of said outer cylindrical bushing and said given diameter of said cylindrical cavity being between 0.5 percent and 2 percent of the diameter of said outer cylindrical bushing, at least said outer bushing being formed of a plastic having a tensile strength of at least 600 kg./cm.$^2$ and a modulus of elasticity which varies from 8,000 to 20,000 kg./cm.$^2$, injecting rubber under pressure between said bushings to cause a controlled resilient increase in the diameter of said outer bushing until the periphery thereof contacts the wall of the mould, vulcanizing the rubber, maintaining the injection pressure during vulcanization to form a vulcanized rubber sleeve, and relieving said pressure to permit said outer bushing to return resiliently towards its initial diameter, whereby said outer bushing maintains close surface contact with the vulcanized rubber sleeve to compensate at least in part for shrinking strains resulting from its vulcanization.

2. A process according to claim 1, wherein said outer bushing is subjected to the additional step of thermal shrinkage for augmenting the resilient return forces caused by the elasticity of said outer bushing.